(12) United States Patent
Kim

(10) Patent No.: US 8,450,223 B2
(45) Date of Patent: May 28, 2013

(54) MULTIPLE LAYERED HEATPROOF CLOTH FOR THERMAL RESISTANT AND METHOD OF MANUFACTURING THEREOF

(75) Inventor: Ji Wan Kim, Seoul (KR)

(73) Assignee: Pyro Industries, Inc., Yongin-Si, Gyeonggi-Do (KR)

( * ) Notice: Subject to any disclaimer, the term of this patent is extended or adjusted under 35 U.S.C. 154(b) by 464 days.

(21) Appl. No.: 12/585,413

(22) Filed: Sep. 15, 2009

(65) Prior Publication Data
US 2010/0138983 A1 Jun. 10, 2010

(30) Foreign Application Priority Data
Oct. 10, 2008 (KR) .................. 10-2008-0099825

(51) Int. Cl.
| | |
|---|---|
| B32B 27/04 | (2006.01) |
| B32B 27/12 | (2006.01) |
| B32B 5/02 | (2006.01) |
| B32B 9/02 | (2006.01) |
| B32B 5/26 | (2006.01) |
| B32B 5/06 | (2006.01) |
| D04H 1/00 | (2006.01) |
| D04H 3/00 | (2012.01) |
| D04H 5/00 | (2012.01) |
| D04H 13/00 | (2006.01) |

(52) U.S. Cl.
USPC ........... 442/136; 442/323; 442/326; 442/389; 442/390; 442/414; 428/920; 428/921

(58) Field of Classification Search
USPC ............... 442/136, 321, 323, 326, 414, 381, 442/389, 390, 394; 428/920, 921
See application file for complete search history.

(56) References Cited

U.S. PATENT DOCUMENTS

| | | | | |
|---|---|---|---|---|
| 4,237,108 A | * | 12/1980 | Fukuhara et al. | 423/447.4 |
| 4,726,987 A | * | 2/1988 | Trask et al. | 442/373 |
| 5,116,679 A | * | 5/1992 | Nadkarni et al. | 428/367 |
| 5,933,865 A | * | 8/1999 | Aldridge | 2/81 |
| 6,670,291 B1 | * | 12/2003 | Tompkins et al. | 442/136 |
| 2001/0007247 A1 | * | 7/2001 | Zilka et al. | 122/379 |
| 2004/0203310 A1 | * | 10/2004 | Watanabe et al. | 442/414 |
| 2006/0084332 A1 | * | 4/2006 | Muschelknautz et al. | 442/228 |
| 2009/0209155 A1 | * | 8/2009 | Goulet | 442/234 |

* cited by examiner

*Primary Examiner* — Elizabeth Cole
*Assistant Examiner* — Jeremy R Pierce
(74) *Attorney, Agent, or Firm* — GWiPS

(57) ABSTRACT

A heatproof cloth forms multiple layers of laminated fabrics for resisting the high-temperature, comprising a high-temperature shielding fiber fabric which shields external heat, a first carbon felt fabric which distributes the heat transmitted through the high-temperature shielding fiber fabric, an aluminum vapor-deposited fabric which shields the heat distributed by the first carbon felt fabric, a second carbon felt fabric which distributes the heat transmitted through the aluminum vapor-deposited fabric, an aluminum vapor-deposited heat-resistant fabric which shields and distributes the heat distributed by the second carbon felt fabric, an aramid felt fabric which distributes the heat transmitted through the aluminum vapor-deposited heat-resistant fabric, and aramid fabric which shields the heat distributed by aramid felt fabric. Since heat is shielded and distributed repeatedly through three steps, the transmission of external heat is effectively prevented. Accordingly, the heatproof clothes are durable to prevent the deformation by the heat of extremely high-temperature while f is improved.

1 Claim, 6 Drawing Sheets

| | |
|---|---|
| fiber woven fabric | 111 |
| first carbon felt fabric | 112 |
| aluminum vapor-deposited fabric | 113 |
| second carbon felt fabric | 114 |
| aluminum vapor-deposited heat-resistant fabric | 115 |
| aramid felt fabric | 116 |
| aramid fabric | 117 |

MULTIPLE LAYERED HEATPROOF CLOTH FOR THERMAL RESISTANT AND METHOD OF MANUFACTURING THEREOF

BACKGROUND OF THE INVENTION

1. Field of the Invention

The present invention relates to a heatproof cloth forming multiple of laminated layers of thermal-resistant fabrics for high-temperature, which has properties of lighter-weight, soft and limber for easily moving, so that it is applied to manufacture a heatproof clothes for a firefighter by integrating the same materials to safely rescue the victims from a fire disaster.

2. Description of the Related Art

The heatproof clothes are generally used by firefighters for fighting the fire flames to rescue the victims, who are trapped in the high-temperature of flamed building. Another example, the workers who are working nearby a casting furnace or an iron smelting plant is required to put on the heatproof clothes. The heatproof clothes are essential for the firefighters and casting workers to protect themselves from such an extremely high-temperature heat.

The heatproof clothes are consisted of an upper heatproof garment, a lower heatproof garment, a pair of the heatproof gloves, and a heatproof hood.

According to the standard inspection of the Korea Industrial Safety Corporation and the Korea Fire Equipment Inspection Corporation, the conventional heatproof clothes are comprised of outer fabrics made of a heat-resistant cloth material formed by vapor-depositing and heating a special aluminum coating on a heat resistant aramid fiber, and an inner fabrics made of a heat-resistant fibers.

In addition, a rubber sheet layer formed by coating a nylon fabric with rubber is inserted in a sewing state between the outer fabrics and the inner fabrics together with quilted wool felt, thereby forming an inner insulating layer.

According to the above description of the conventional heatproof cloth, the insulating layers between the outer fabrics and the inner fabrics including rubber sheet along with the wool felt, which increases the overall weight of heatproof clothes. Such a heavy weight of heatproof clothes makes the wearer dull moving with inefficiency.

FIG. 1 shows the conventional heatproof clothes. As shown in the drawing, the heatproof clothes comprises a plurality of separated pieces including an upper heatproof garment 101, a lower heatproof garment 102, heatproof gloves 103, a heatproof hood 105 and heatproof overshoes 104.

The respective pieces of the heatproof clothes are putting on in a specific order. Because it takes time to put on all the pieces, it causes for firefighters to delay arriving at a place of a fire braking out. Furthermore, the overall weight of the heatproof clothes is about 22~25 kg, such a heavy weight makes the firefighters moving dull.

Due the heavy weight of the heatproof clothes, it is recommended to reduce the overall weight to 15 kg or less for efficient rescuing the potential victims from the fire fighting site.

If the number of the laminated layers is merely deleted for decreasing the overall weight, it would be caused the unreliable and poor quality of the heatproof clothes. Even worse, the firefighter, who wears the unreliable heatproof clothes is threatened his life during the fire fighting.

SUMMARY OF THE INVENTION

The purpose of the present invention is to overcome the aforementioned problems. An objective of the present invention is to provide a heatproof cloth forming multiple laminated layer of heatproof fibers for high-temperature, which is capable of maximizing safety and efficient movement for the user by using silica and carbon materials having excellent adiabatic functions so as to withstand direct exposure to fire and effectively reducing the overall weight of heatproof clothes.

Another objective of the present invention is to provide the heatproof clothes for protecting a user from the high-temperature flame. The heatproof clothes is integrally formed an upper garment, a lower garment and overshoes, which has properties of lighter-weight, soft and limber for easily moving, so that the overall weight of the heatproof clothes can be reduced while the quality is remained reliable to protect the users from furious flames.

In accordance with an aspect of the present invention, the above and other objects can be accomplished by the provision of a laminated fabric layer for high-temperature heatproof clothes, including a high-temperature shielding fiber fabric which shields external heat, a first carbon felt fabric which distributes the heat transmitted through the high-temperature shielding fiber fabric, an aluminum vapor-deposited fabric which shields the heat distributed by the first carbon felt fabric, a second carbon felt fabric which distributes the heat transmitted through the aluminum vapor-deposited fabric, an aluminum vapor-deposited heat-resistant fabric which shields and distributes the heat distributed by the second carbon felt fabric, an aramid felt fabric which distributes the heat transmitted through the aluminum vapor-deposited heat-resistant fabric, and an aramid fabric which shields the heat distributed by the aramid felt fabric.

In accordance with another aspect of the present invention, there are provided Integrated high-temperature heatproof clothes manufactured using a laminated fabric layer to protect a wearer's body from flames, the high-temperature heatproof clothes integrally including an upper garment part including a front zipper on a front side thereof for convenient wear, a lower garment part continuously connected to a lower part of the upper garment part, and a pair of overshoe parts connected to both sides of a lower end of the lower garment each through a sewing part.

DETAILED DESCRIPTIONS OF THE PREFERRED EMBODIMENT

Hereinafter, the multiple laminated layers of thermal resistant fabrics for heatproof against the high-temperature flames according to the present invention will be described in detail accompanying with the drawings.

FIG. 2 to FIG. 5 are the cross-sectional views of multiple laminated layers of the thermal resistant fabrics according to various embodiments of the present invention.

Figures 1, 2:
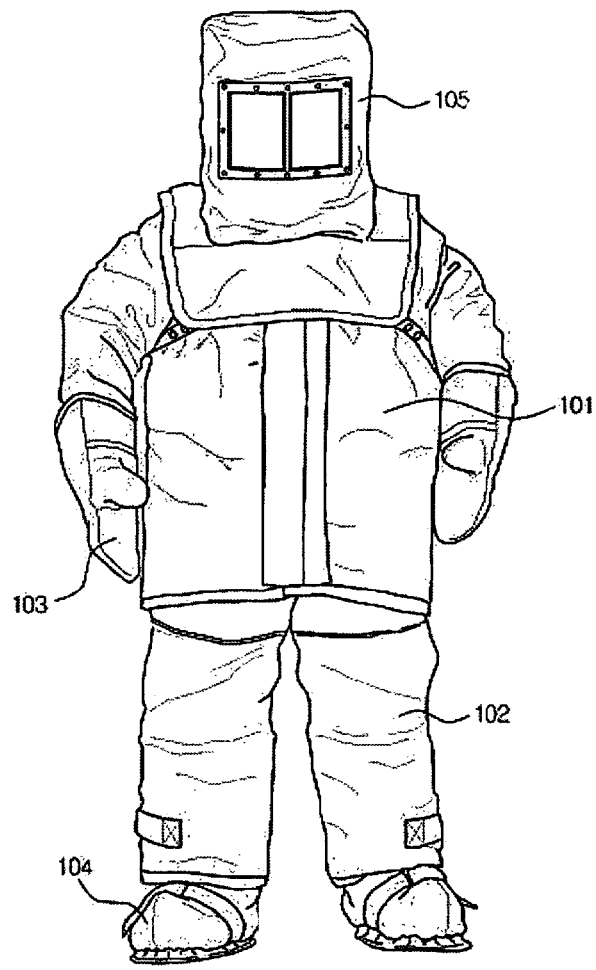
FIG. 1 is the conventional heatproof clothes, which is separately made of each garment part to put on the individual pieces, one by one.
FIG. 2 to FIG. 5 are the cross-sectional views of the multiple laminated layers of thermal resistant fabrics according to the various embodiments of the present invention.

Multiple Laminated Layers of Thermal Resistant Fabric:
Embodiment 1:

According to a first embodiment as shown in FIG. 2, the multiple laminated fabric layer for high-temperature heatproof clothes comprises a high-temperature shielding fiber woven fabric 111 shielding external heat, a first carbon felt fabric 112 distributing heat transmitted through the high-temperature shielding fiber woven fabric 111, an aluminum vapor-deposited fabric 113 shielding the heat distributed by the first carbon felt fabric 112, a second carbon felt fabric 114 distributing the heat transmitted through the aluminum vapor-deposited fabric 113, an aluminum vapor-deposited heat-resistant fabric 115 shielding and distributing the heat distributed by the second carbon felt fabric 114, an aramid felt fabric 116 distributing the heat transmitted through the aluminum vapor-deposited heat-resistant fabric 115, and an aramid fabric 117 shielding the heat distributed by the aramid felt fabric 116.

Hereinafter, the respective fabric components constituting the multiple laminated fabric layers will be described in detail.

The high-temperature shielding fiber woven fabric 111 may be implemented by a fabric woven by a heat-resistant mineral fiber or a silica fiber including quartz, ceramic and carbon capable of enduring a high temperature. Exemplarily, the present embodiment uses the silica fiber.

Here, an outer surface of the high-temperature shielding fiber woven fabric 111 is coated with a high heat resistant coating so as to prevent leakage of heat through pores of the high-temperature shielding fiber woven fabric 111. Silicon may be used for the high heat resistant coating.

Exemplarily, the high-temperature shielding fiber woven fabric 111 may have a thickness of about 1.5~2 mm.

In addition, the high-temperature shielding fiber woven fabric 111 needs to have a rear surface temperature of not greater than 40° C. when exposed to a radiant heat of not less than 1,000° C. for 5 minutes or more, and should not cause deformation of the high heat resistant coating upon contact with a direct heat of about 1,650° C. for 2 minutes or more.

The first carbon felt fabric 112 has density in the range of about 300~800 kg/m$^3$ which is proper to achieve the optimum heat distribution effect. That is, when the first carbon felt fabric 112 is manufactured with a density higher than 800 kg/m$^3$ or lower than 300 kg/m$^3$, heat distribution efficiency may be deteriorated.

Exemplarily, the first carbon felt fabric 112 has a thickness of about 3.0~3.5 mm.

The aluminum vapor-deposited fabric 113 is formed by performing general vapor-deposition of a thin aluminum film on one surface, more exemplarily, an outer surface of a general fiber fabric. The above-layered aluminum vapor-deposited fabric 113 reflects and shields heat.

Exemplarily, the aluminum vapor-deposited fabric 113 has a thickness of about 0.8~1.2 mm.

The second carbon felt fabric 114 has density in the range of about 300~800 kg/m$^3$ which is proper to achieve the optimum heat distribution effect. That is, when the second carbon felt fabric 114 is manufactured with the density higher than 800 kg/m$^3$ or lower than 300 kg/m$^3$, the heat distribution efficiency may be deteriorated.

Exemplarily, the second carbon felt fabric 114 has thickness of about 3.0~3.5 mm.

The aluminum vapor-deposited heat-resistant fabric 115 is formed by performing general vapor-deposition of a thin aluminum film on one surface, more exemplarily, an outer surface of a general fiber fabric, and then attaching a heat-resistant fleece fabric to the other surface of the general fiber fabric to prepare a laminated layer.

The one surface vapor-deposited with the thin aluminum film reflects and shields heat whereas the other surface, to which the heat-resistant fleece fabric is attached, distributes heat.

Exemplarily, the aluminum vapor-deposited heat-resistant fabric 115 has thickness of about 1.5~2 mm.

The aramid felt fabric 116 is constituted by an aramid felt forming one surface thereof, and polytetraflouroethylene (PTFE), so called Gore-Tex, attached to a rear surface of the aramid felt, to form a laminated layer, so as to perform heat distribution.

Exemplarily, the aramid felt fabric 116 has thickness of about 1~1.5 mm. The aramid fabric 117 being used as an inner lining and, to this end, has a basis weight of about 200 g/m$^2$ to perform the heat shielding function.

The above-layered laminated fabric for the heatproof clothes should not cause deformation of any component material when exposed to a radiant heat of about 1,000° C. for 10 minutes or more.

Figure 3:
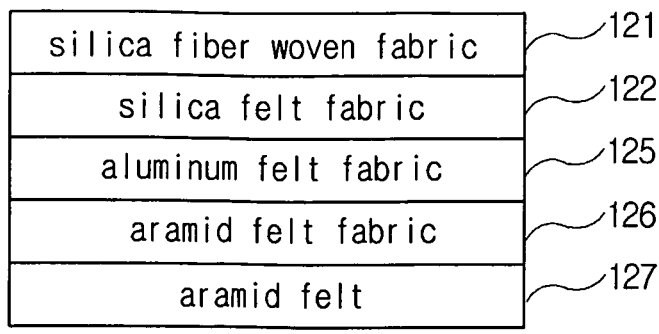

Embodiment 2:

FIG. 3 shows multiple laminated fabric layers according to a second embodiment of the present invention. The multiple laminated fabric layers may comprise a silica fiber woven fabric 121 to shield external heat, a silica felt fabric 122 deposited on an upper side of the silica fiber woven fabric 121 to distribute heat, an aluminum felt fabric 125 deposited on an upper side of the silica felt fabric 122 to shield heat, an aramid felt fabric 126 deposited on an upper side of the aluminum felt fabric 125 to distribute heat, and an aramid felt 127 deposited on an upper side of the aramid felt fabric 126 to shield heat.

Figure 4:
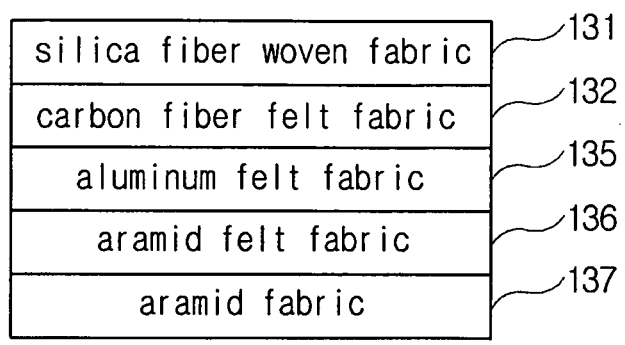

Embodiment 3:

FIG. 4 shows multiple laminated fabric layers according to a third embodiment of the present invention. The multiple laminated fabric layers comprise a silica fiber woven fabric 131 to shield external heat, a carbon fiber felt fabric 132 deposited on an upper side of the silica fiber woven fabric 131 to distribute heat, an aluminum felt fabric 135 deposited on an upper side of the carbon fiber felt fabric 132 to shield heat, an aramid felt fabric 136 deposited on an upper side of the aluminum felt fabric 135 to distribute heat, and an aramid fabric 137 deposited on an upper side of the aramid felt fabric 136 to shield heat.

Figure 5:
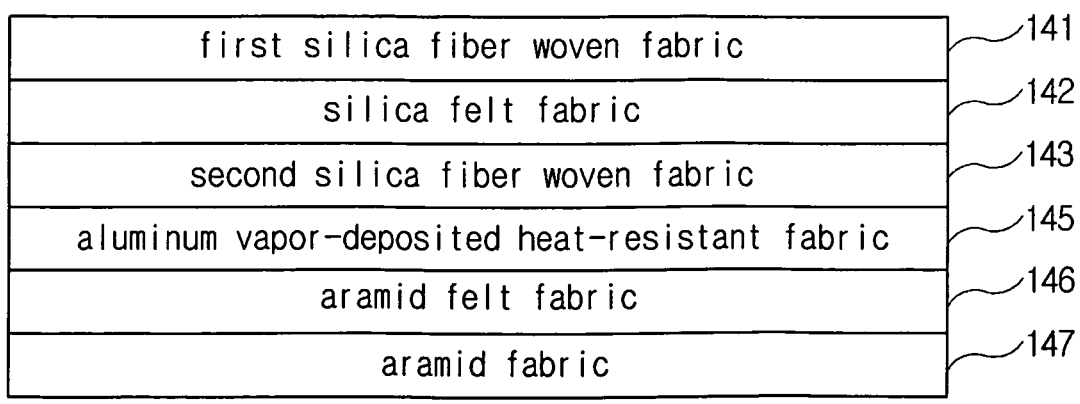

Embodiment 4:

FIG. 5 shows multiple laminated fabric layers according to a fourth embodiment of the present invention. The multiple laminated fabric layers comprise a first silica fiber woven fabric 141 to shield external heat, a silica felt fabric 142 deposited on an upper side of the first silica fiber woven fabric 141 to distribute heat, a second silica fiber woven fabric 143 deposited on an upper side of the silica felt fabric 142 to shield heat, an aluminum vapor-deposited heat-resistant fabric 145 deposited on an upper side of the second silica fiber woven fabric 143 to shield and distribute heat, an aramid felt fabric 146 deposited on an upper side of the aluminum vapor-deposited heat-resistant fabric 145 to distribute heat, and an aramid fabric 147 deposited on an upper side of the aramid felt fabric 146 to shield heat.

Heatproof Clothes for High-Temperature:

Hereinafter, the heatproof clothes integrally manufactured for high-temperature by using the multiple laminated fabric layers according to the above embodiments will be explained in detail with reference to FIG. 6 to FIG. 12.

Figure 6:
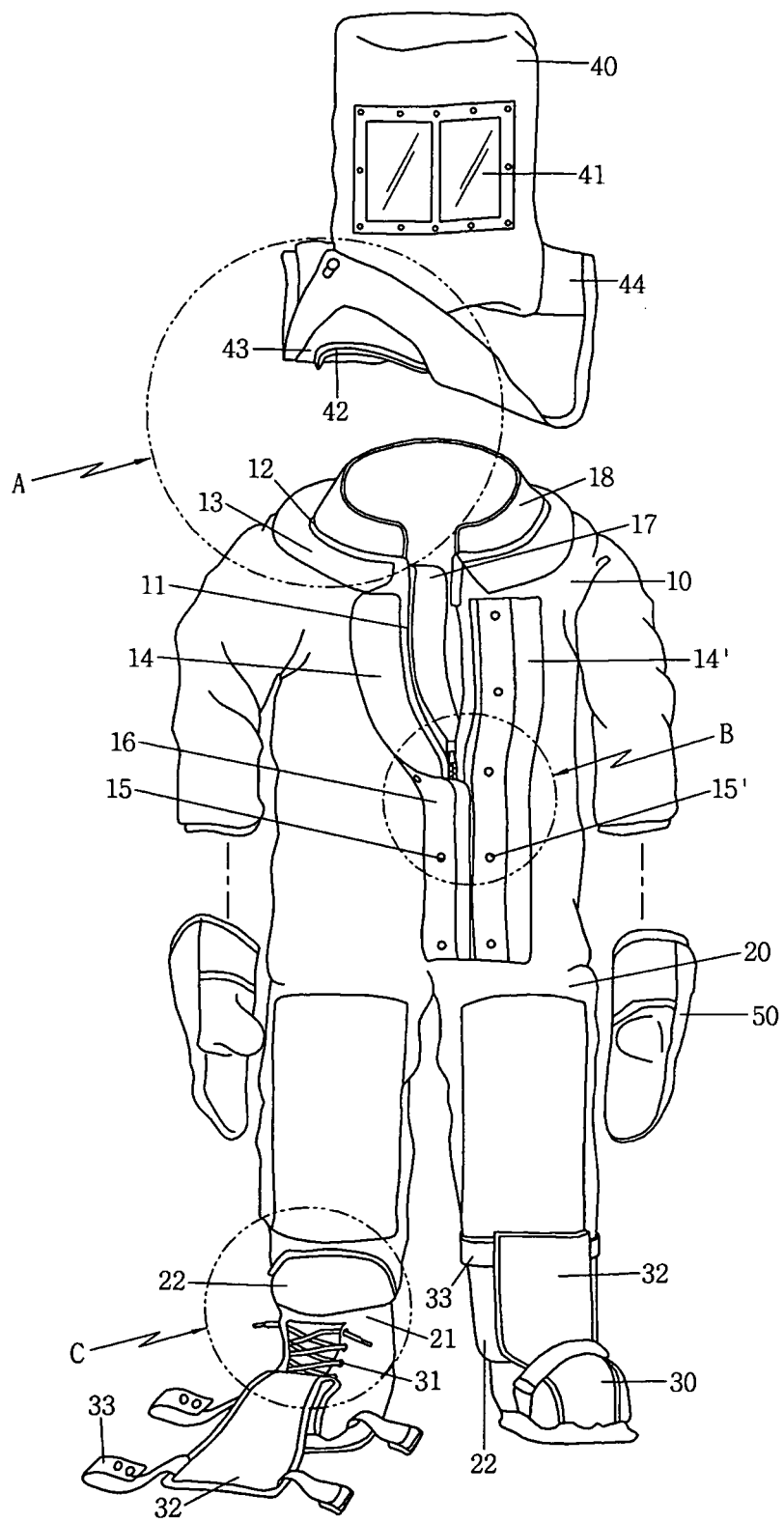
FIG. 6 shows the exterior appearance of the heatproof clothes integrated according to the present invention.
Figure 7:
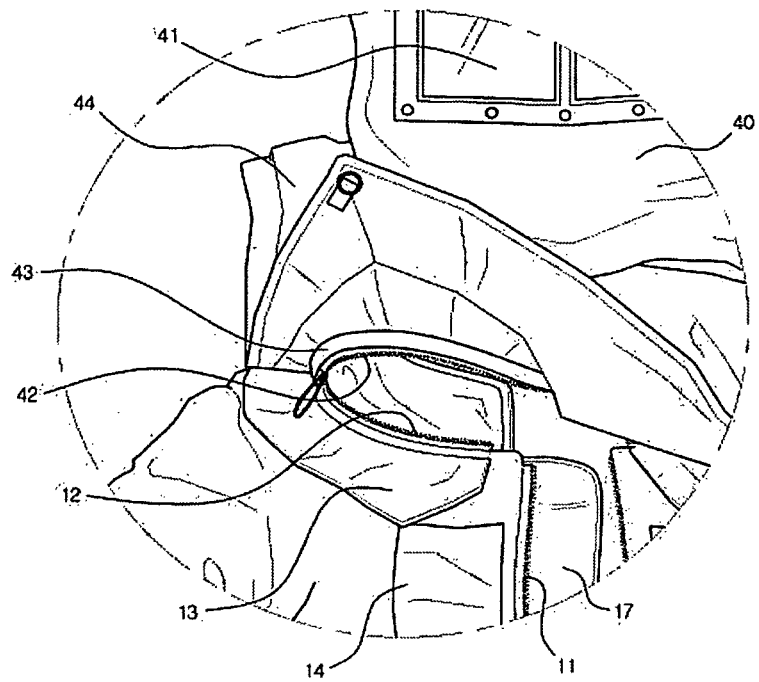
FIG. 7 is an enlarged view of a portion "A" of FIG. 6, which is a hood connecting part of the heatproof clothes according to the present invention.
Figure 8:
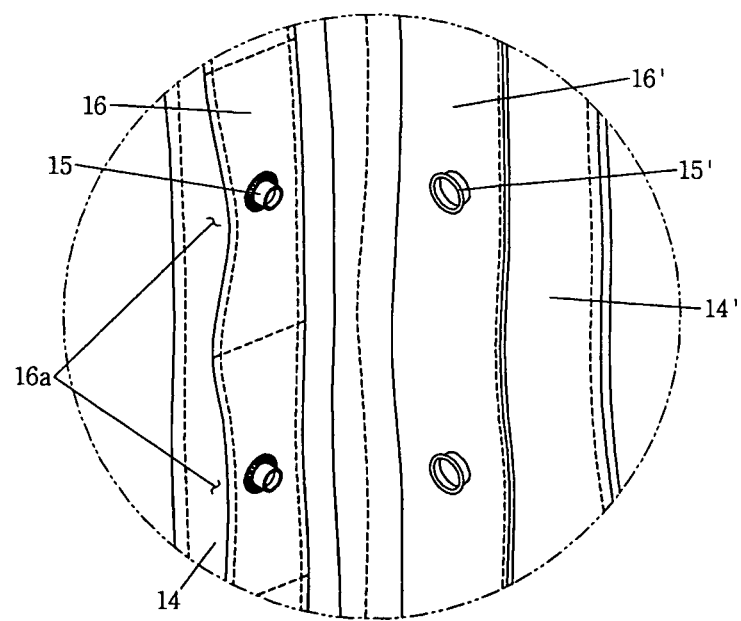
FIG. 8 is an enlarged view of a portion "B" of FIG. 6, which is a front zipper part of the heatproof clothes according to the present invention.
Figure 9:
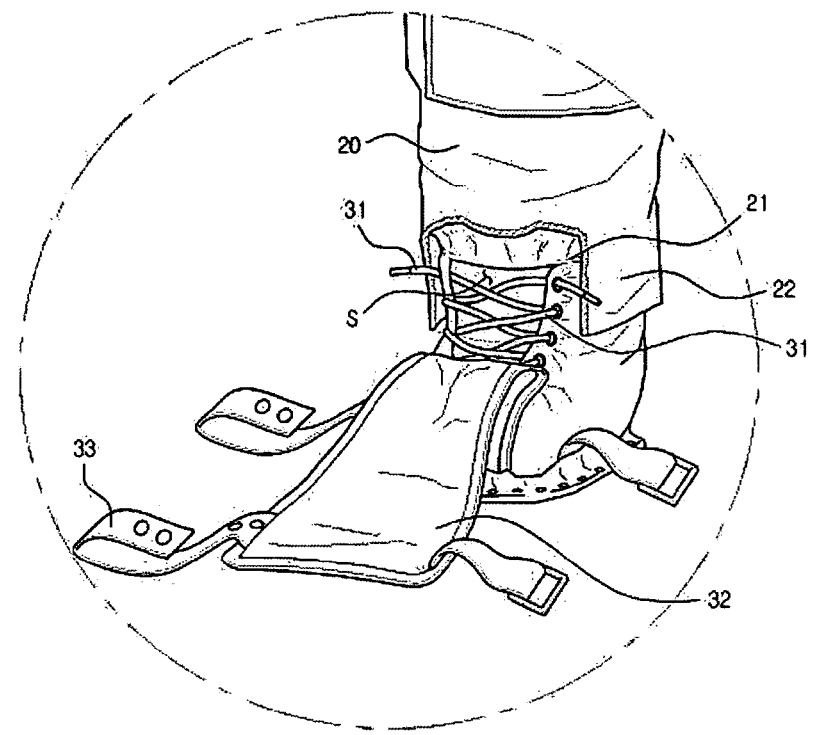
FIG. 9 is an enlarged view of a portion "C" of FIG. 6, which is an overshoes connecting part of the heatproof clothes according to the present invention.
Figure 10:
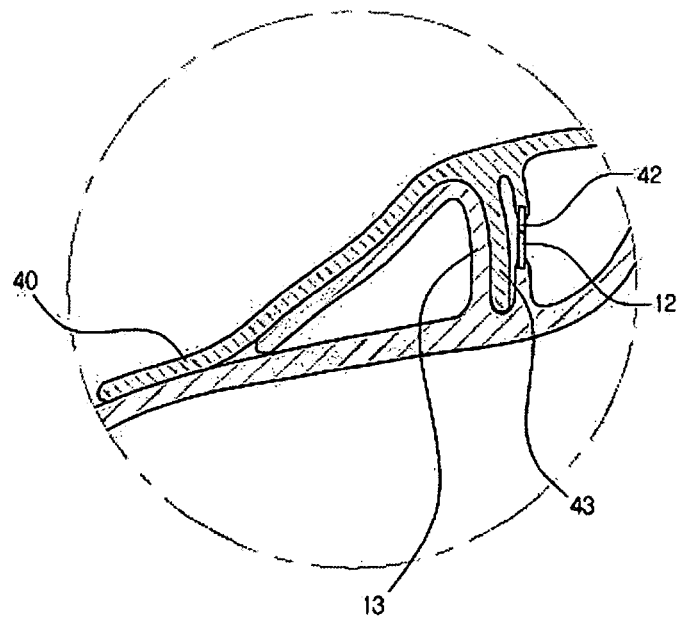
FIG. 10 is a cross sectional view showing the connecting status of the hood connecting part according to the present invention.
Figure 11:
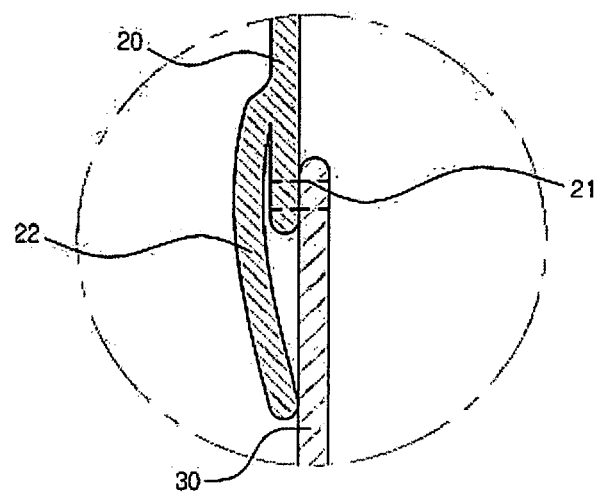
FIG. 11 is a cross sectional view of the overshoes connecting part according to the present invention.

FIG. 6 is an exterior appearance view of the integrated heatproof clothes according to the present invention. FIG. 7 is an enlarged view of a portion "A" of FIG. 6, which is a connecting part of a hood of the heatproof clothes. FIG. 8 is an enlarged view of a portion "B" of FIG. 6, which is a front zipper part of the heatproof clothes. FIG. 9 is an enlarged view of a portion "C" of FIG. 6, which is an overshoes connecting part of the heatproof clothes. FIG. 10 is a cross-sectional view showing the connection status of the hood connecting part, and FIG. 11 is a cross-sectional view of the overshoes connecting part.

First, referring to FIG. 6, the heatproof clothes is comprises that an upper garment part 10 and a lower garment part 20 are continuously connected, and a pair of overshoe parts 30 is also connected by sewing to a lower end of the lower garment 20, such that the three parts are all integrally connected.

The upper garment part 10 has a front zipper 11 formed on a front side thereof in a vertical direction for convenient wear, and a detachable zipper 12 formed at an upper end of the front zipper 11 around a neck part. The detachable zipper 12 is selectively connected and separated to and from a detachable zipper 42 of the hood 40.

Cover cloths 14 and 14' are formed on both sides of the front zipper 11, respectively, to doubly prevent exposure of the front zipper 11. As shown in the enlarged view of FIG. 8, fastening buttons 15 and 15' are provided in corresponding pairs at a plurality of positions on the cover cloths 14 and 14'. The fastening buttons 15 and 15' are fixed to reinforcing bands 16 and 16' sewn on the cover cloths 14 and 14'. The reinforcing band 16 disposed at one side is sewn so as to be spaced apart from the cover cloth 14 at uniform intervals so that predetermined spaces 16*a* are formed.

In addition, an inner shielding layer 17 is formed at one inner side of the front zipper 11 to prevent direct contact between the front zipper 11 and a wearer's body.

Additionally, as shown in the enlarged view of FIG. 7, lower and upper shielding layers 13 and 43 are provided such that infiltration of heat through a connecting part between the detachable zippers 12 and 42 can be prevented in a state wherein the hood 40 is attached through connection between the detachable zippers 12 and 42.

Referring to the enlarged view of FIG. 9, each of the overshoe parts 30 is connected to the lower garment part 20 with an upper circumferential end thereof through a sewing part 21. The overshoe part 30 includes an opening part S formed on the front thereof and tightened by a tightening string 31, and a cover layer 32 preventing exposure of the tightening string 31 to the outside. The cover layer 32 may be equipped with fastening bands 33 on both sides thereof. The fastening bands 33 fasten the cover layer 32 around each ankle part of the lower garment part 20.

A pair of ankle cover parts 22 is further provided at both lower ends of the lower garment part 20 to prevent infiltration of heat through the sewing parts 21. The ankle cover part 22 is shown in a partially cut-away state in FIG. 9 for better understanding.

A neck girth part 18 is extended from the upper garment part 10 up to the wearer's neck. A shoulder brace 44 is flanged to support the hood 40 on shoulder areas of the upper garment part 10. A pair of the heatproof gloves 50 is separately provided to protect the wearer's hands.

Hereinafter, a process order to put on the heatproof clothes and operational effects by use of the heatproof clothes will be explained.

First, in a state wherein the hood 40 and the heatproof gloves 50 are separated, a wearer completely opens the front zipper 11 formed at the upper garment part 10 and then puts on the heatproof clothes by inserting his or her legs first.

Therefore, as the wearer puts on the heatproof clothes, the overshoes part 30, the lower garment part 20 and the upper garment part 10 are all put on simultaneously. Next, the front zipper 11 is zipped up so that the cover cloths 14 and 14' of both sides overlap. Next, the fastening buttons 15 and 15' are fastened so that the front zipper 11 is not exposed.

Especially, since the reinforcing band 16 attached with the fastening buttons 15 of one side is sewn on the cover cloth 14 at uniform intervals, thereby forming the spaces 16*a*, the wearer may be able to support and fasten the fastening buttons 15 and 15' more conveniently by inserting his or her fingers into the spaces 16*a*.

In the overshoes part 30, the tightening strings 31 formed at both sides are pulled to tighten the opening part S to the minimum size. Next, the shielding layer 32 covers the opening part S. Simultaneously, the fastening bands 33 are put around the ankle part and fastened to each other. According to this, external heat can be completely prevented from infiltrating through the overshoe part 30.

After both of the overshoe parts 30 are tightly put on, the hood 40 is put on the wearer's head and connected to the heatproof clothes using the detachable zippers 12 and 42.

More particularly, after the detachable zippers 12 and 42 are fastened around the neck girth part as shown in FIG. 7, the upper shielding layer 43 is pulled down to primarily cover the detachable zippers 12 and 42. Next, the lower shielding layer 13 is raised to secondarily cover the detachable zippers 12 and 42. Accordingly, infiltration of external heat through a gap between the heatproof clothes and the hood 40 can be almost perfectly prevented.

Finally, the heatproof gloves 50 are put on, thereby completing the wearing of the heatproof clothes.

The heatproof clothes having the integrated multiple layers generate minimum spaces at connecting parts among the respective parts, that is, the upper and lower garment parts 10 and 20, the overshoe parts 30, and the hood 40 when put on the wearer. In other words, overlapped parts which used to be generated between separate upper and lower garment parts of the conventional heatproof clothes are minimized. Therefore, the overall weight of the heatproof clothes can be reduced while infiltration of external heat through the connecting parts, which are susceptible to heat infiltration, can be effectively prevented.

Referring to FIG. 10, since the detachable zippers 12 and 42 formed at a hood connecting part are covered with the lower and upper shielding layers 13 and 43, infiltration of not only external heat but also toxic gas can be prevented, thereby protecting the wearer's respiratory organs.

Furthermore, referring to FIG. 11, connecting parts between the overshoe parts 30 and the lower garment part 20 are covered with the ankle cover parts 22 which are fastened by the fastening bands 33.

Thus, even minor gaps of the connecting parts are shielded, thereby improving air-tightness of the heatproof clothes.

Figure 12:
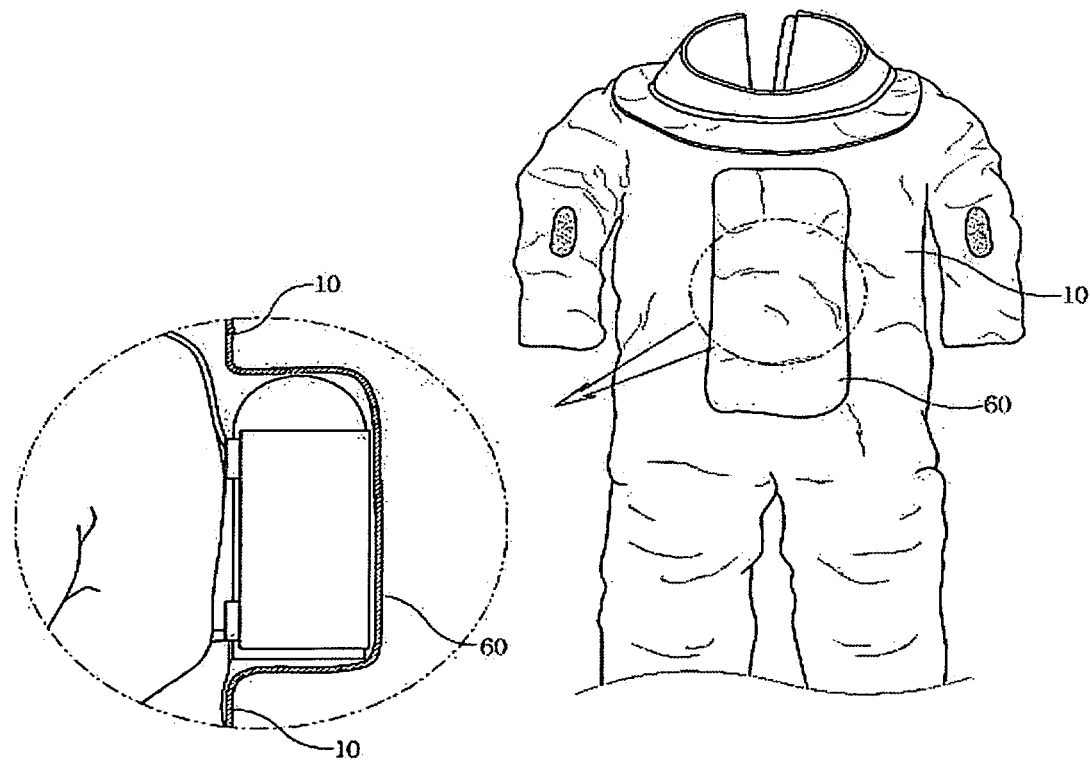
FIG. 12 is a schematic drawing to show the overlapped cover of a compressed air tank receiving part of the heatproof clothes.

FIG. 12 is a schematic drawing to show the overlapped cover of a compressed air tank receiving part of the heatproof clothes. As shown in FIG. 12, the compressed air tank receiving part 60 for receiving a compressed air tank is integrally formed with a rear side of the upper garment part 10.

More specifically, the compressed air tank receiving part 60 is protruded outward from the upper garment part 10 to form a predetermined space to receive a compressed air tank.

Here, the compressed air tank receiving part 60 is provided to enable the wearer to wear the compressed air tank inside the heatproof clothes. The compressed air tank can be safely protected from heat by the heatproof clothes. In addition, the wearer's movement will not be dull by friction between the compressed air tank and the heatproof clothes during the rescue activity.

As apparent from the above description, the heatproof clothes of the present invention applies the multiple laminated fabric layers for protecting against the high-temperature flame. The repeated heat shield and heat distribution through three steps improves durability of the heatproof clothes, thereby it will be more effectively shield against a high-temperature heat transmitted from the outside, restrain deformation of the material due to a high-temperature radiant heat.

Since most part of the multiple laminated fabric layers is formed of silica and carbon, the adiabatic function to endure direct exposure to fire is greatly improved while the overall weight of the clothes is reduced. When the heatproof clothes are manufactured by using the multiple laminated fabric layers, the heatproof clothes would be easy to moving. Therefore, the rescue activity can be efficiently improved.

In addition, since an upper garment part, a lower garment part and overshoe part according to the present invention are in an integrated form, overlapped parts that used to be generated among the respective pieces, the upper and lower garments, a hood, and overshoes of conventional separate-type heatproof clothes are removed. Also, the overall weight of the heatproof clothes can be reduced to about 15 kg from about 22 kg comparing to the conventional heatproof clothes. Therefore, the rescue activity during the fire fighting will be efficiently improved. Furthermore, air tightness among the respective pieces is improved, thereby effectively preventing inflow of external heat.

A hood is removable formed using a zipper so as to be selectively connected to the upper garment. Therefore, an inflow of a toxic gas through a gap between the hood and the upper garment to the wearer's respiratory organs can be more effectively prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A heatproof cloth forming multiple layers of laminated thermal-resistant fabrics for high-temperature, the heatproof cloth comprising the multiple layers in the following order:
   an outer surface layer forming a high-temperature shielding fiber fabric for shielding external heat, wherein said high-temperature shielding fiber fabric comprises a heat-resistant mineral fiber, being selected from one of quartz, ceramic, carbon and silica, further the outer surface layer of the high-temperature shielding fiber fabric being coated with a high heat resistant coating,
   a second layer forming a first carbon felt fabric for distributing the heat transmitted through the high-temperature shielding fiber fabric, wherein said first carbon felt fabric has a density of approximately 300~800 kg/m$^3$,
   a third layer forming an aluminum vapor-deposited fabric for shielding the heat distributed by the first carbon felt fabric, wherein said aluminum vapor-deposited fabric is formed by vapor-depositing a thin aluminum film on one side of a general fiber fabric,
   a fourth layer forming a second carbon felt fabric for distributing the heat transmitted through the aluminum vapor-deposited fabric, wherein said second carbon felt fabric has a density of approximately 300~800 kg/m$^3$,
   a fifth layer forming an aluminum vapor-deposited heat-resistant fabric for shielding and distributing the heat distributed by the second carbon felt fabric, wherein said aluminum vapor-deposited heat-resistant fabric is formed by performing general vapor-deposition of a thin aluminum film on one surface of a general fiber fabric, then attaching a heat-resistant fleece fabric on the other surface of the general fiber fabric into a lamination layer,
   a sixth layer forming an aramid felt fabric distributing the heat transmitted through the aluminum vapor-deposited heat-resistant fabric, and
   a seventh layer forming an aramid fabric for shielding the heat distributed by the aramid felt fabric, wherein said aramid felt fabric comprises an aramid felt forming one surface thereof, and a breathable and water repellent fiber fabric attached to a rear surface of the aramid felt.

\* \* \* \* \*